Feb. 23, 1954  E. D. PERRY ET AL  2,670,109
MACHINE FOR STRINGING BEADS OR
OTHER LIKE PIERCED ARTICLES
Filed Oct. 4, 1950  2 Sheets-Sheet 2

Inventors:
Edward D. Perry
and Salvatore D. Garzone
By
Attorneys.

Patented Feb. 23, 1954

2,670,109

UNITED STATES PATENT OFFICE 2,670,109

MACHINE FOR STRINGING BEADS OR OTHER LIKE PIERCED ARTICLES

Edward D. Perry, East Providence, and Salvatore D. Garzone, Johnston, R. I., assignors to Ansul-Craft, Inc., Providence, R. I., a corporation of Rhode Island Application October 4, 1950, Serial No. 188,366

9 Claims. (Cl. 223—48)

This invention relates to a machine for feeding and stringing beads and other pierced or hollow articles.

One object of the invention is to provide a machine of the type indicated having a hopper for containing a supply of pierced ornamental beads or similar hollow objects and means for stringing the beads on a suspended wire or the like whence they may be taken off in groups and strung on a chain or cord to form a necklace or other article of adornment.

Another object is to provide a machine of the type indicated having means adjustable to regulate the number of beads or other objects initially strung on the wire in a group during continuous feeding and stringing of additional beads while preventing them from feeding to a previously-strung group segregated for transfer to a necklace or the like.

Another object is to provide means for maintaining continuous feeding of the beads or other objects and stringing them on the initial wire holder while a previously-strung group of beads is delivered from the wire to the chain or cord for final assembly into a necklace or other article of jewelry.

Another object is to provide a machine of the type indicated capable of being operated at high speed to continuously feed and string the beads or other objects onto the collecting wire preparatory to transferring them to a chain or cord on which they are finally assembled in a necklace or the like.

Further objects of the invention are set forth in the following specification which describes a preferred form of construction of the machine as illustrated by the accompanying drawings. In the drawings.

Figure 1:
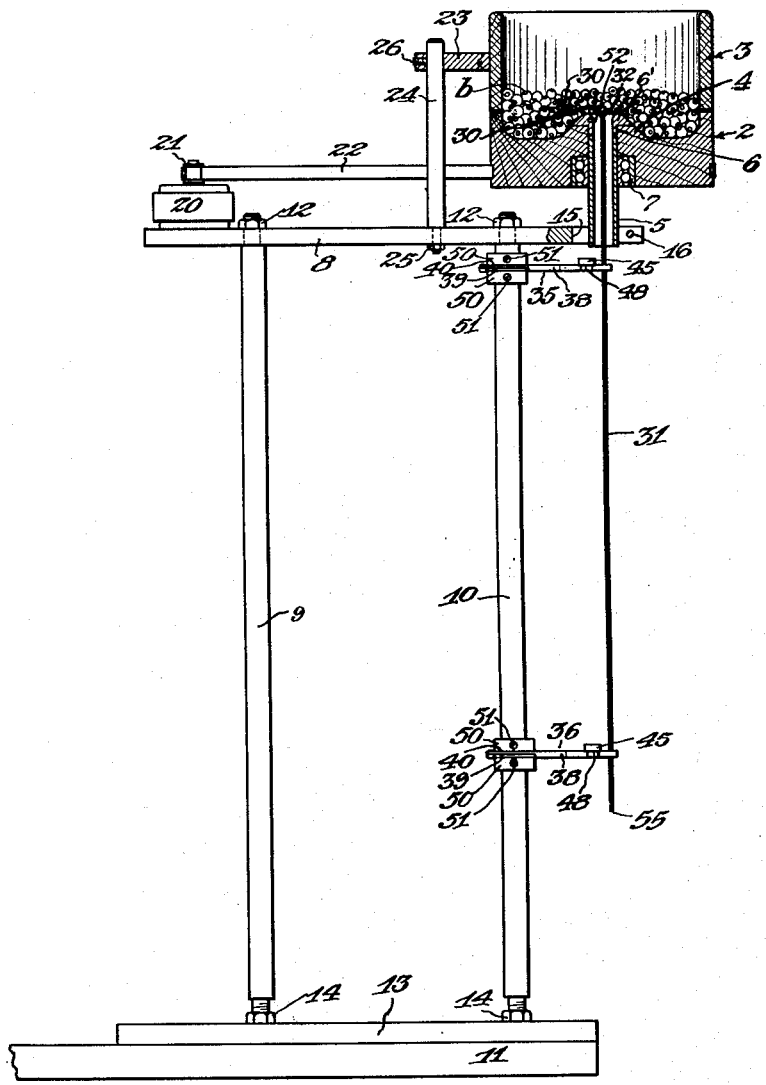
Fig. 1 is an elevational view of the present bead-stringing machine illustrating the supply-hopper and its connected parts in transverse section with a quantity of beads shown in the hopper.

In the manufacture of jewelry, pearls, beads and other ornamental objects are strung on chains or silken cords to assemble them in necklaces, and in other cases on fine wire to produce bracelets or the like. In accordance with the usual practice, beads and like objects are strung individually by hand and this involves a slow and tedious process. It is therefore an object of the present invention to provide automatically-operated means for stringing the beads or like objects on a wire in series of numerically proportioned groups whereby they can be transferred conveniently to a chain or cord for final assembly in necklaces and other articles of jewelry. With this desirable object in view the present invention consists in a machine in which a supply of perforated beads or other hollow objects are held in a hopper and means provided for feeding them therefrom and stringing them onto a wire, from which selected groups may be transferred directly onto a chain or cord for final assembly.

As herein shown the present machine comprises a cylindrical hopper composed of two superimposed sections 2 and 3 with the lower saucer-shaped base-section 2 mounted for rotation by any suitable driving means. The lower bead-containing section 2 may be constructed of any suitable material, such as wood, plastic or the like, with an upwardly-projecting hub 4 at its center bored axially to receive a vertically-extending tube 5. The upper end of the tube 5 engages against the end of a metal thimble 6 held in the hub 4 and formed with a flange overlying the upper face of the hub. The flange 6' on the thimble 6 is beveled to conform to the tapered shape of the hub 4 and the tubular extension of the thimble is fixedly held in the bore of the hub to provide an axial thrust-bearing cooperating with the end of the tube 5. The tube 5 is thus constituted as a bearing-spindle for the rotary base-portion 2 of the hopper with ball-bearings 7 inserted in its bottom wall to provide for free rotation thereof. The bearing-tube 5 is fixedly mounted on a supporting plate 8 sustained in horizontal elevated position by means of vertical standards or rods 9 and 10 supported from the floor 11. The rods 9 and 10 are reduced at their upper ends to provide threaded portions inserted through holes in the plate 8 with nuts 12 screwed thereon to secure the parts in rigid connection. The lower ends of the rods 9 and 10 may also have reduced threaded extensions seated in holes in a plate 13 on the floor with nuts 14 thereon bearing against the plate to raise or lower the rods independently and level the upper plate or table 8. As shown more particularly in Fig. 2, the supporting plate 8 is bored to receive the tubular bearing-tube 5 for the hopper and split through the bore at 15 with a binder-screw 16 inserted through its bifurcated portions to clamp them against the tube and hold it rigidly in vertical relationship. An electric motor 20 on the rearward end of the supporting plate 8 carries a driving pulley 21 with a belt 22 encircling the base of the lower hopper-section 2 in a groove in its periphery to connect the hopper-section for rotation.

It has been indicated that only the lower or base-portion 2 of the hopper is rotatably mounted, its upper section 3 being stationary for a purpose later explained. As shown in Fig. 1, the upper section 3 of the hopper consists simply of a hollow cylinder to which is attached a bracket 23, see Fig. 2, mounted on a vertical rod 24 bolted to the supporting plate 8 at 25. The bracket 23 is bored to receive the rod 24 and is secured thereto by means of a set-screw 26 shown in Fig. 1. In this way the upper cylindrical section 3 of the hopper is held stationary above the lower rotary section 2 with a clearance between the bottom of its wall and the top of the outer wall of said lower section. The purpose of this construction and arrangement of the two-part hopper is to prevent the beads or other articles from climbing upwardly on the inner wall of the hopper under the influence of centrifugal force as the lower section 2 is rotated rapidly around the tubular bearing 5.

Figure 2:
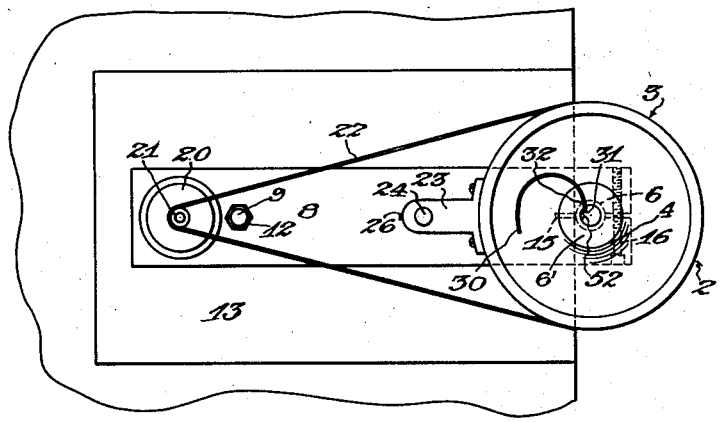
Fig. 2 is a plan view of the machine showing the driving means for rotating the supply-hopper.

During the rotation of the lower section 2 of the hopper the beads $b$ or other objects contained therein are agitated and rolled on each other to position them for engagement with the end of an arcuately-shaped wire 30, see Fig. 2, projecting laterally from a vertically-suspended wire 31 on which the beads $b$ are to be strung. The arcuate or circular extension 30 of the wire 31 is inclined downwardly at one side of the hub 3 in the hopper-section 2 and during the rotation of the latter the beads or other objects are swirled around within this section and caused to feed toward the end of the extension wire. Under the action of centrifugal force the beads or other objects are impaled on the end of the wire 30 and caused to feed upwardly and radially inward to traverse this portion of the wire and slide along its curved neck 32 to be strung onto its depending vertical portion 31. As the beads or other perforated objects thus slide down on the depending portion of the wire 31 means are provided to arrest their continued travel to the end of the wire so that they may be apportioned in groups of any desired number for eventually stringing them on chains or cords for assembly in necklaces and other articles of jewelry.

Figure 3:
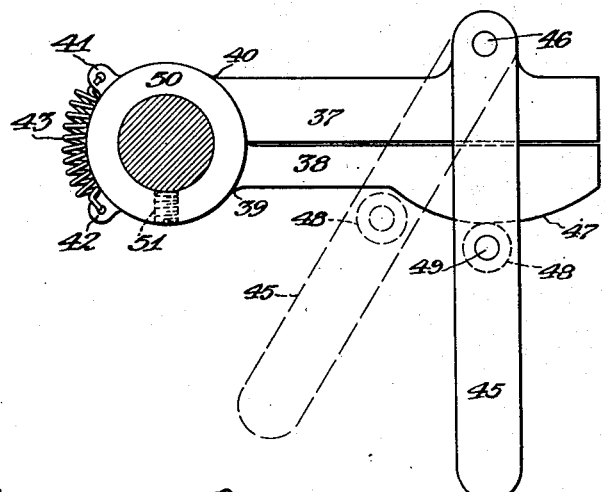
Fig. 3 is an enlarged plan view of the clamping means which engages and supports the wire on which the beads are initially strung while providing a stop for regulating the number of beads apportioned in a group on the wire prior to releasing them for delivery to the chain or cord on which they are finally assembled.
Figures 4, 5:
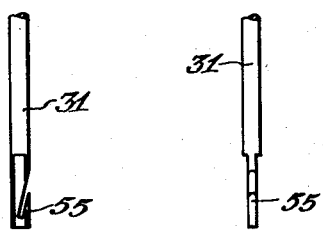
Fig. 4 is an enlarged detailed view of a section of the wire on which the beads are initially strung showing the hook at its lower end for attachment thereto of a length of chain or cord to which the beads or other objects are finally transferred.
Fig. 5 is a similarly enlarged view of the wire looking in the opposite direction.

The means for arresting the flow of the beads downwardly along the vertical portion of the wire 31 may comprise one or more stops in the form of adjustable clamps 35 and 36 mounted on the rod 10. The clamps 35 and 36 also serve as the means for supporting the wire 31 from the rod 10. A practical form of such clamping means for the stops is illustrated in the enlarged view, Fig. 3. As therein shown a pair of clamping arms 37 and 38 have individual hubs 39 and 40 rotatably mounted on the rod 10 with perforated ears 41 and 42 projecting radially therefrom. A helical spring 43 connected between the ears 41 and 42 tends to swing the arms 37 and 38 apart to release their clamping action which is effected by means of a handle or lever 45 pivoted at 46 to the arm 37. The opposite arm 38 is formed with a cam-shaped enlargement 47 on its side adapted to be engaged by a roller 48 rotatably mounted on a pin 49 in the lever 45. When the lever 45 is turned into the position shown by full lines in Fig. 3 it will force the two arms 37 and 38 toward each other to bind them against the wire 31 and thus serve as a stop to prevent the beads or other objects from sliding down the wire. By swinging the lever 45 into the opposite position illustrated by dash-lines in Fig. 3 the roller 48 will ride off from the cam 47 to release the two arms 37 and 38 so that the spring 43 will act to swing said arms into open position. Two of the clamping means as above described may be provided on the rod 10 with collars 50 above and below their hubs for holding them in adjusted vertical relationship. The collars 50 have set-screws 51 for fixedly securing them in place on the rod 10. By releasing the set-screws 51 the clamps 35 and 36 may be adjusted to any desired position, the lower one 36 being set to regulate the number of beads initially strung on the wire 31 to form a group with the number apportioned to the length of the necklace or other article of jewelry to be made therefrom. The upper clamping means 35 is employed to prevent additional beads from feeding down on the wire 31 while a group is being released by opening the lower clamping means 36 as explained later in connection with the complete operation of the machine.

Referring to Figs. 1 and 2, a pin or rivet 52 inserted in the upper portion of the thimble 6 has its head projecting into the interior thereof to provide an abutment adapted to engage in some instances with the upper curved neck 32 of the wire 31 as the thimble 6 rotates with the lower hopper-section 2. Should the wire tend to cant or lean toward the side of the bore in the tube 5 it will be struck by the head of the pin 52 to force it back into axial relationship.

The method of operation of the complete machine is as next explained. To prepare the machine for operation a supply of beads $b$ or other perforated objects is placed in the hopper to be held principally by its lower saucer-shaped section 2. The upper stop formed by the clamp 35, shown in Fig. 1 as adjusted to a position adjacent the bottom of the tube 5, is first released by swinging the hand-lever 45 to the position shown by dash lines in Fig. 3 to release the arms 37 and 38 whereby they are swung open by the spring 43. The bottom clamp 36 may be adjusted to a position adjacent the lower end of the wire 31, or at any suitable distance from the upper stop to provide for the desired number of beads to be strung on the wire between the stops.

The motor 20 is started and through the pulley 21 and belt 22 it will rotate the lower section 2 of the hopper at a rapid rate of speed. As the hopper is rotated it will cause the beads $b$ to be swirled around within its interior as they roll or slide on each other. With the beads thus agitated and swirled around the interior of the hopper, centrifugal force will carry them outwardly against the walls thereof while bringing certain of them into contact with the end of the curved wire 30 to impale them thereon, whereafter the beads will slide along the wire by the pressure of other beads adjacent thereto to cause them to slide over the curved neck 32 and down onto the vertical portion of the wire 31. In this way the beads are continuously picked up and strung on the vertical portion of the wire 31 to collect them in a group building up from the bottom stop 36 at the lower end of the wire. After the required number of beads have been collected on the wire 31 the upper stop is applied thereto by clamping the arms 37 and 38 against the wire through the means of the hand-lever 45. To transfer the beads collected on the wire 31 to form a necklace or other article of jewelry a fine chain or length of cord is attached to the lower end of the wire by means of its hook 55. When this has been accomplished the clamping arms 37 and 38 of the lower stop 36 are released and the beads assembled between the two stops are allowed to slide off from the end of the wire 31 onto the chain or cord which assembles them in a necklace or the like. During this operation of transferring the beads to assemble them in a necklace or the like the rotation of the hopper is continued to feed additional beads down against the upper stop 35; then, after the beads have been transferred from the lower end of the wire 31, the upper stop can again be released to allow the beads fed onto the upper portion of the wire to slide down until they are arrested by the lower stop. In this way the machine will operate continuously to automatically string the beads on the wire 31 and collect the desired number in groups for transfer into necklaces or other articles of jewelry. The initial stringing of the beads and their eventual transfer for assembly in necklaces or the like is accomplished very rapidly without manual operation except for adjusting the stops on the wire 31 and transferring the groups of beads to the chains or cords on which they are assembled in the form of a necklace, bracelet or the like.

As the supply of beads in the hopper is depleted more may be added thereto from time to time to make the operation of the machine continuous over extended periods of time. As before stated, the arrangement of the upper section 3 of the hopper to hold it stationary prevents the beads from riding up along its inner wall to escape at the top. That is to say, as the beads are agitated and thrown outwardly by centrifugal force toward the enclosing wall of the hopper-section 2 during its rotation they will strike against the wall of the section 3 but will have little tendency to roll or ride up thereon due to the upper section being held stationary.

It will be observed from the foregoing specification that the present invention provides a particularly ingenious machine for automatically stringing beads or other objects in groups apportioned to the length of the necklace, bracelet or other article in which they are assembled. The machine is simple in construction and efficient in operation without expert attention on the part of an operator.

While the machine is shown herein as embodied in a preferred form of construction, it is to be understood that modifications may be made in the structure and arrangement of its parts without departing from the scope of the invention as expressed by the following claims. Therefore, without limiting ourselves in this respect, we claim:

1. In a machine for stringing beads and like objects, a hopper for containing a supply of such objects, a hollow bearing rotatably supporting said hopper, a motor drivingly connected to the hopper for rotating said hopper, an axial passage leading through the bottom of the hopper and said bearing, and a wire extending vertically through said passage and provided with a curved extension projecting laterally from the upper end of the passage into said hopper, the free end of said extension of the wire adapted to impale the objects thereon to cause them to slide down the vertical wire.

2. In a machine for stringing beads and other pierced objects, a two-part hopper for containing a supply of the objects, said hopper having a lower saucer-like rotatable section and a stationary upper cylindrical walled section surmounting the lower section with its wall forming a continuation of the outer wall of the bottom section, bearing means for rotatably supporting the lower section of said hopper, power-operated means drivingly connected to rotate the lower section of the hopper, an axial passage leading through the bottom of the lower hopper section and its bearing, a wire extending vertically through said passage in the bottom of the hopper and formed at its upper end with a laterally-projecting extension, the free end of said extension being adapted to impale the pierced objects thereon, and means adjustable along the vertical portion of the wire to provide stops for regulating the flow of strung objects descending on the wire.

3. In a machine for stringing beads and other pierced objects, a two-part hopper for containing a supply of the objects, said hopper having a rotatable bottom section and a stationary upper cylindrical walled section surmounting the bottom section, means for holding said upper section from rotating with the bottom section, a tubular axial bearing for mounting the bottom section of the hopper to rotate about its axis relatively to the upper section, power-operated means drivingly connected to rotate the bottom section of the hopper on said tubular bearing, and a wire extending vertically through said tubular bearing and formed with a laterally-projecting curved extension at the top projecting into the hopper with its free end adapted to impale the pierced objects thereon.

4. In a machine for stringing beads and other pierced objects, a two-part cylindrical hopper for containing a supply of the objects, said hopper formed with an upper cylindrical walled section held stationary and a lower saucer-like section, a tubular bearing for mounting the lower section to rotate relatively to the upper stationary section, a wire extending vertically through said tubular bearing and formed with an arcuately-shaped extension at the top projecting laterally within the hopper, and stop-means adapted to be adjusted longitudinally of that portion of the wire extending below the hopper to arrest the flow of the objects strung on the wire at different points therealong.

5. In a machine for feeding and stringing beads or like objects, a hopper for containing a supply of the objects, a hollow bearing rotatably supporting said hopper, power-operated means drivingly connected to the hopper to rotate said hopper, a tubular axial passage extending through the bottom of the hopper and said bearing, a fixedly held wire extending through the passage in the bottom of the hopper to a point at a distance therebelow and having an extension at its top projecting laterally therefrom into the hopper to adapt its free end to impale the objects thereon, and clamping means adjustable longitudinally of the depending portion of the wire to provide stops for arresting the descent of the objects strung on the wire.

6. In a machine for stringing beads and like pierced objects, a hopper for containing a supply of the objects, a hollow bearing rotatably supporting said hopper, power-operated means drivingly connected to the hopper for rotating said hopper, an axial passage leading through the bottom of the hopper and said bearing, a fixed wire extending downwardly through said passage and depending therebelow, said wire formed with an upper curved extension with its free end in position to impale the objects in the hopper during the rotation thereof, a hook at the lower end of the wire for connecting a chain or cord thereto, and stops adjustable vertically of the wire to arrest the passage of the objects at different points along said wire.

7. In a machine of the type indicated, a rotary hopper for containing a supply of beads or like pierced objects, a hollow bearing rotatably supporting said hopper, power-operated means drivingly connected to rotate said hopper, an axial passage extending down through the bottom of the hopper and said bearing, a fixedly-held wire depending axially through the passage in the hopper and having a lateral extension in the hopper with its free end positioned for impaling the objects thereon, stop-means having clamping arms straddling the depending portion of the wire, and manually-operable means for closing said clamping means against the wire whereby to regulate the flow of the strung beads downwardly along the wire.

8. In a machine of the type indicated, a horizontal support, standards for mounting said support, means for individually adjusting said standards to level the support, a tubular bearing fixedly held in vertical relationship on said support, a hopper for pierced objects mounted to rotate on said tubular bearing, a wire projecting through said tubular bearing and depending therebelow, said wire having a lateral extension at the top with its free end in position for impaling the pierced objects thereon to adapt them to feed therealong and slide down the depending portion of the wire, stops adjustable longitudinally of the depending portion of the wire to arrest the flow of the strung objects therealong under the force of gravity, means to adjust said stops longitudinally of the wire to control the number of objects strung between said stops, and means to individually release the stops from the wire to pass the objects therebeyond.

9. In a machine of the type indicated, a support, vertical standards for sustaining said support, a tubular bearing mounted vertically on the support, a hopper for beads or like objects rotatable on the tubular bearing, a wire extending through the tubular bearing and depending therebelow, said wire formed with an extension at its upper end projecting laterally into the hopper with its free end in position to adapt it to engage and impale the objects thereon, a pair of clamping means adjustably supported on one of the standards, and manually-operable means for operating said clamping means to clamp them to or release them from the depending portion of the wire to regulate the flow of the strung beads downwardly along the wire.

EDWARD D. PERRY.
SALVATORE D. GARZONE.

References Cited in the file of this patent

FOREIGN PATENTS

| Number | Country | Date |
|---|---|---|
| 767,429 | France | July 17, 1934 |